B. H. VAN AUKEN.
ATTACHMENT FOR COMBUSTION GENERATORS, &c.
APPLICATION FILED DEC. 22, 1910.
1,063,479.
Patented June 3, 1913.
3 SHEETS—SHEET 3.
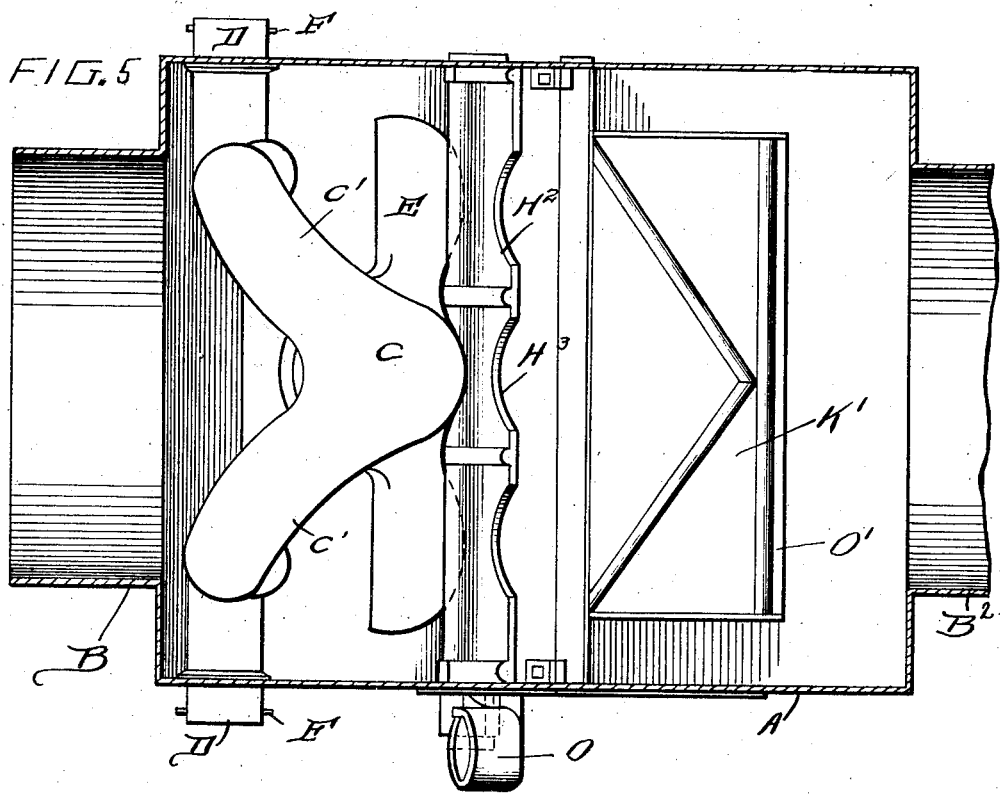
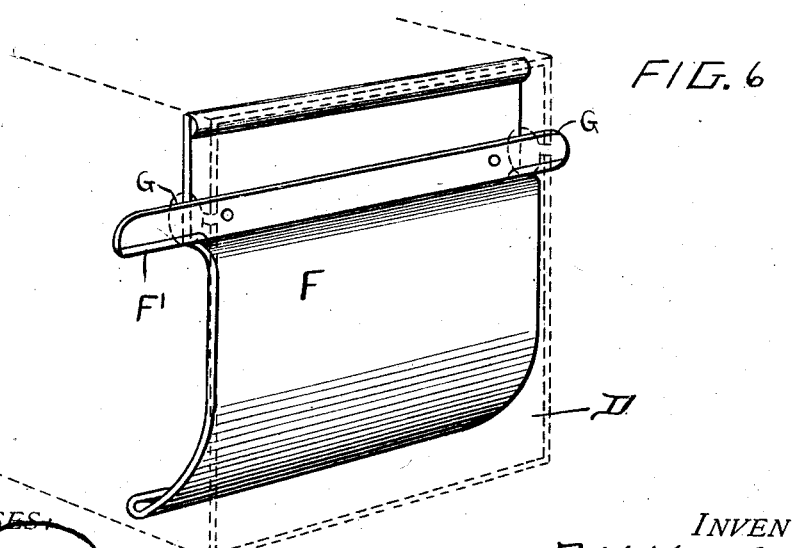
WITNESSES
INVENTOR
B. H. Van Auken.
BY
Attorney

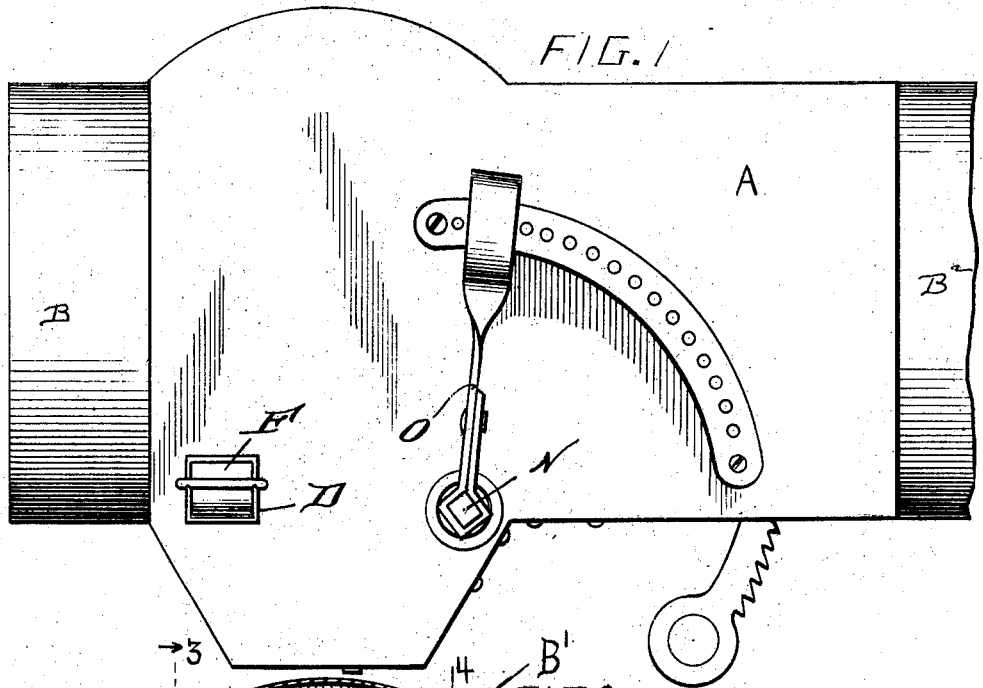
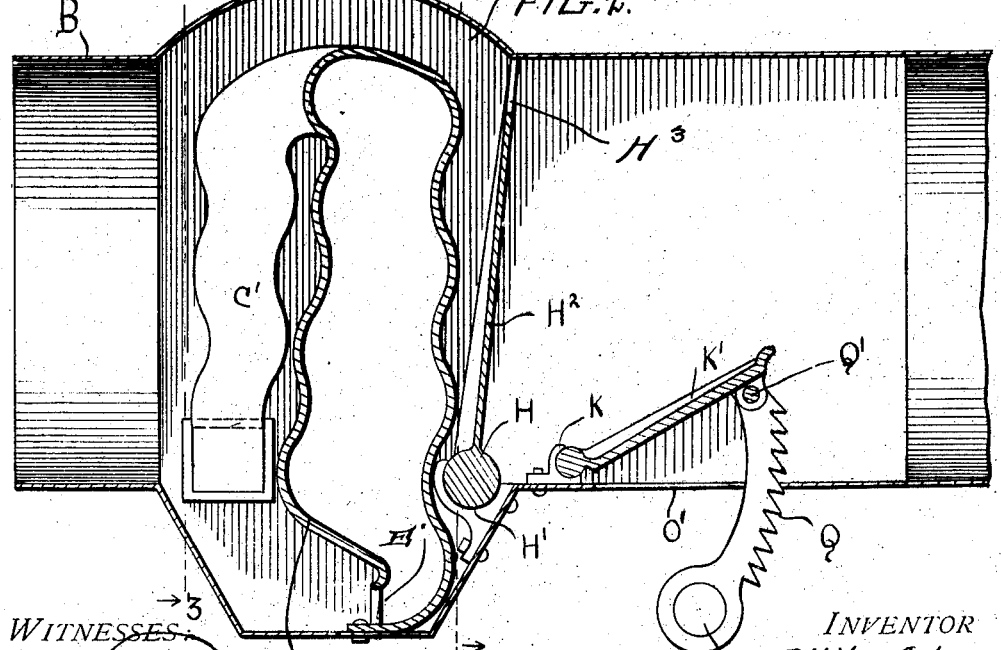

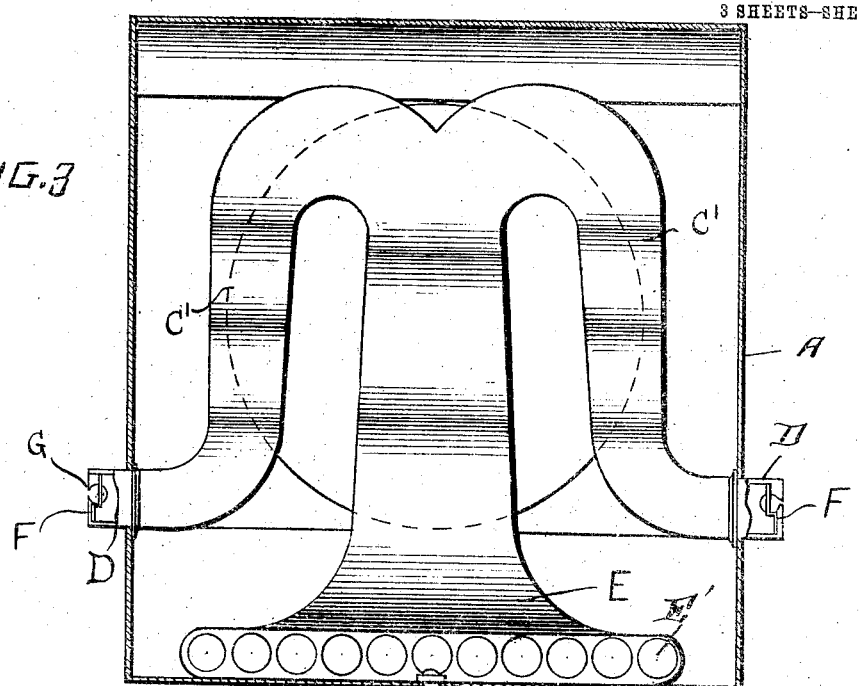
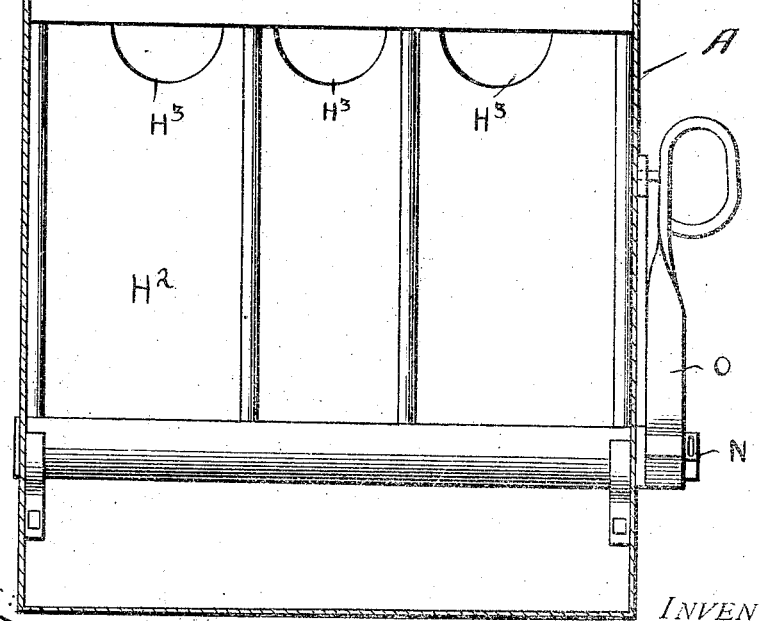

UNITED STATES PATENT OFFICE.

BENJAMIN H. VAN AUKEN, OF RAHWAY, NEW JERSEY.

ATTACHMENT FOR COMBUSTION-GENERATORS, &c.

1,063,479.

Specification of Letters Patent.

Patented June 3, 1913.

Application filed December 22, 1910. Serial No. 598,743.

*To all whom it may concern:*

Be it known that I, BENJAMIN H. VAN AUKEN, a citizen of the United States, residing at Rahway, in the county of Union and State of New Jersey, have invented certain new and useful Improvements in Attachments for Combustion-Generators, &c.; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in combined combustion promotors, fuel economizers and draft controllers for furnaces of various kinds and the object in view is to produce an automatic means whereby a constant flow of heated air may be supplied to a furnace for combustion purposes holding the gases in check or retarding their flow and at the same time afford automatic means for preventing the escape of noxious gases from the furnace through the air supply duct when the pressure of gases exceeds the pressure of atmospheric air in the cellar or other compartment in which the furnace may be located.

The invention consists specifically in the provision of a chamber positioned within a specially designed casing, connecting at one end to the smoke collar of furnace and at the other end to the pipe leading from the furnace to the chimney and having openings to the atmosphere controlled by automatically operated dampers, the chamber having increasing capacity to allow for the expansion of the air as it is heated, the contour of the walls of the chamber being corrugated to form eddies which will cause the various particles of air to come into contact with the radiating surface of the wall of the chamber.

The invention comprises various other details of construction and combinations and arrangements of parts which will be hereinafter fully described and then specifically defined in the appended claims.

I illustrate my invention in the accompanying drawings, in which:—

Figure 1 is a side elevation of a smoke pipe to which my apparatus is applied. Fig. 2 is a central longitudinal sectional view through the form shown in Fig. 1. Fig. 3 is a sectional view taken on line 3—3 of Fig. 2. Fig. 4 is a sectional view on line 4—4 of Fig. 2. Fig. 5 is a section through the pipe showing the apparatus in top plan view, and Fig. 6 is a detail perspective view of one of the automatic dampers.

Reference now being had to the details of the drawings by letter, A designates a casing, one end B of which is adapted for connection with the smoke pipe leading from a furnace, not shown, and its other end is connected to a pipe $B^2$ adapted to communicate with a chimney. Said casing has an enlarged chambered portion B' in which is positioned an air heating chamber C which forms a means of communication between the outside atmosphere and the interior of the chambered portion B' of the casing. Upon reference to the drawings, it will be noted that the air heating chamber C has two branching passageways and which, together with the main chamber C, are of gradually increasing capacity and that each branching part communicates with an opening D formed in the wall of the chambered portion of the casing. A valved damper F is pivotally mounted in each of said openings to allow air to freely pass in but adapted to close upon any back pressure from the air heating chamber. Said chamber C flares at one end as at E and shown clearly in Fig. 3 of the drawings and is provided with a series of exit openings E' therein through which the air makes exit into the interior of the chambered portion of the casing. It will be noted upon reference to Fig. 2 of the drawings that the wall of the air heating chamber, as well as the curved compartments C' thereof, is corrugated in order to afford a maximum contact heating surface which will be exposed to the waste heat from the products of combustion as they pass from the furnace to the chimney and the corrugated wall is provided for the purpose of forming eddies in the volume of incoming air which will have a tendency to bring the various particles of the air into intimate contact with the radiating surface of the wall of the heating chamber thereby thoroughly heating it.

F, F designate automatically operated dampers, one mounted in each opening D of the air chamber and each valve is provided with a pivotal knife edge F' which has a bearing in the marginal edges of the apparatus C formed in the side walls of the contracted portions of the passageways of the air heating chamber, said knife edges being provided in order to reduce the friction to a minimum and allow the dampers to tilt under varying conditions of drafts passing through the chimney. Said dampers are so counterbalanced that under normal conditions they will be open but on the holding in check of the furnace gases by closing the gas damper, the pressure of which gases would exceed the normal pressure of the atmospheric air in the cellar or other compartment in which the furnace is located, said dampers will automatically close and prevent the escape through the air supply ducts of the gases to the cellar or other compartment in which the furnace is located.

Upon reference to Figs. 2 and 4 of the drawings will be seen a rock shaft, designated by letter H, to which a damper $H^2$ is fixed and which damper is pivotally mounted in suitable bearings H'. One end of said rock shaft projects through the wall of the casing, is squared as at N and has a hand-operated bar O fixed thereto, forming means for rocking the shaft for the purpose of opening or closing the damper. Upon reference to Fig. 4 of the drawings, it will be noted that the upper marginal edge of the damper is provided with openings $H^3$ which are provided for the purpose of allowing for the passage to the chimney of the incombustible portions of the gases. Pivoted in bearings K fastened to the inner surface of the casing B is a cold air check damper K' which, when closed, will cover an opening O' formed in the bottom of that portion of the casing which leads to the chimney.

Q designates a curved ratchet bar pivoted at Q' to a lug upon the cold air check damper and its other end $Q^2$ forms a handle whereby the ratchet bar may be utilized for opening or closing the damper K', the teeth of said bar being designed to engage the marginal edge of the opening O' to hold the damper at different inclinations.

While I have shown a hand-operated mechanism for regulating the cold air check damper, it will be understood that any suitable form of thermostatically operated apparatus may be employed but which is not illustrated and which will cause said damper to be automatically operated. It will also be noted that the pivotal jointed connection between the damper K' and its bearings K is such as to allow the damper to be easily removed when desired for the purpose of cleaning the smoke pipe or for other purposes.

In operation, it will be understood that the apparatus will at all times be in readiness to heat outside atmospheric air preparatory to its being conveyed to the combustion chamber of a furnace, the supply of air fed being dependent upon the force of the draft through the casing with which communication adapted to be had with a chimney. When the fire in a furnace to which the apparatus is adapted to be attached, is first started, the gas damper should be open to allow the volatile gases to pass off, after which the gas damper is thrown to a closed position, the openings $H^3$ in the swinging edge thereof being ordinarily of sufficient capacity to allow the incombustible portions of the gases to pass freely to the chimney in order to keep the fire burning properly. As the atmospheric air is drawn into the compartments of the air heating chamber and as it comes into contact with the corrugated surfaces of the chamber, eddies will be formed in the incoming air, thus thoroughly heating the air by bringing all the particles of the latter into intimate contact with the radiating surfaces of the wall which is heated by the waste heat passing through the casing. The increasing capacity of the air heating chamber will allow for the expansion of the air as it becomes heated while flowing through chamber and the draft through the casing will cause the heated air to be drawn through the exit openings and into the interior of the chambered portion of the casing and from which it may be drawn by suitable draft to a furnace to aid in the combustion of the gases. In the event of the pressure of the gases generated in the combustion of the fuel exceeding the normal atmospheric pressure of the cellar or other compartment in which the furnace to which the apparatus is adapted to be applied, may be positioned, said automatic dampers will close, thus preventing the escape of the gases through the air duct which has been a great objection and a danger with air blast furnaces and combustion devices of various kinds.

What I claim to be new is:—

1. A combustion promoter comprising a casing through which smoke and products of combustion from a furnace are adapted to pass, an air heating chamber located therein having contracted branching portions leading through the wall of said casing and opening into the atmosphere, said chamber communicating with the interior of the casing, automatically operated dampers positioned in the inlet ends of said branching portions of the chamber and designed to prevent the escape of noxious gases when the pressure of the latter exceeds the normal pressure of the outside atmospheric air, a damper mounted in said casing and provided with openings to allow for the free passage to the atmosphere of incombustible portions of the gases, and a cold air check damper regulating an opening in the bottom of the casing.

2. A combustion promoter comprising a casing through which smoke and products of combustion from a furnace are adapted to pass, an air heating chamber located therein having contracted branching portions leading through the wall of said casing and opening into the atmosphere, said chamber communicating with the interior of the casing, automatically operated dampers positioned in the inlet ends of said branching portions of the chamber and designed to prevent the escape of noxious gases when the pressure of the latter exceeds the normal pressure of the outside atmospheric air, a damper mounted in said casing and provided with openings to allow for the free passage to the atmosphere of incombustible portions of the gases, a cold air check damper pivotally mounted adjacent to an opening in the bottom of the casing, a ratchet segment pivoted to said check damper and having teeth adapted to engage the marginal edge of said opening.

3. A combustion promoter comprising a casing through which smoke and products of combustion from a furnace are adapted to pass, an air heating chamber positioned within the latter and having a corrugated wall and contracted branching portions leading through the wall of the casing and communicating with the atmosphere, an automatically operated damper positioned in each of said branching portions, said chamber having a flaring inner end with series of exit openings, the chamber having gradually increasing capacity from its inlet to its outlet ends to allow for the expansion of the heated air.

In testimony whereof I hereunto affix my signature in the presence of two witnesses.

BENJAMIN H. VAN AUKEN.

Witnesses:
A. L. HOUGH,
A. R. FOWLER.

Copies of this patent may be obtained for five cents each, by addressing the "Commissioner of Patents, Washington, D. C."